(12) United States Patent
Sorrentino et al.

(10) Patent No.: US 10,271,324 B2
(45) Date of Patent: Apr. 23, 2019

(54) METHOD FOR ENABLING DEVICE TO DEVICE COMMUNICATION IN A RADIO COMMUNICATIONS NETWORK

(71) Applicant: Telefonaktiebolaget LM Ericsson (publ), Stockholm (SE)

(72) Inventors: Stefano Sorrentino, Solna (SE); Mats Folke, Vällingby (SE); Stefan Wänstedt, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 284 days.

(21) Appl. No.: 15/127,887

(22) PCT Filed: Dec. 22, 2014

(86) PCT No.: PCT/SE2014/051564
§ 371 (c)(1),
(2) Date: Sep. 21, 2016

(87) PCT Pub. No.: WO2015/152785
PCT Pub. Date: Oct. 8, 2015

(65) Prior Publication Data
US 2017/0105209 A1    Apr. 13, 2017

Related U.S. Application Data

(60) Provisional application No. 61/974,514, filed on Apr. 3, 2014.

(51) Int. Cl.
*H04W 72/04* (2009.01)
*H04W 72/12* (2009.01)
(Continued)

(52) U.S. Cl.
CPC ... *H04W 72/0426* (2013.01); *H04W 72/1278* (2013.01); *H04W 72/1289* (2013.01);
(Continued)

(58) Field of Classification Search
CPC . H04W 72/0426; H04W 76/23; H04W 76/14; H04W 72/1278; H04W 72/1289; H04W 92/18
See application file for complete search history.

(56) References Cited

U.S. PATENT DOCUMENTS

2011/0305179 A1  12/2011  Wang et al.
2012/0163252 A1   6/2012  Ahn et al.
(Continued)

FOREIGN PATENT DOCUMENTS

| WO | 2010082084 A1 | 7/2010 |
| WO | 2013162333 A1 | 10/2013 |
| WO | 2014010995 A1 | 1/2014 |
| WO | 2014126514 A1 | 8/2014 |

OTHER PUBLICATIONS

Extended European Search Report for European Patent Application No. 14888495.0, dated Oct. 30, 2017, 8 pages.
(Continued)

*Primary Examiner* — Melvin C Marcelo
(74) *Attorney, Agent, or Firm* — Sage Patent Group

(57) ABSTRACT

Embodiments herein relate to e.g. methods performed in first and second communication devices for enabling device to device communication between the first communication device and the second communication device in a radio communications network. The first communication device transmits data in a first data transmission to the second communication device according to a first transmission pattern. The first communication device also transmits control information with the data to the second communication device, which control information indicates a second transmission pattern for a next data transmission from the first communication device to the second communication device. The second communication device receives the control information with the data in the first transmission. Further (Continued)

embodiments relate to the first and second communication devices.

29 Claims, 11 Drawing Sheets

(51) Int. Cl.
*H04W 76/23* (2018.01)
*H04W 76/14* (2018.01)
*H04W 92/18* (2009.01)

(52) U.S. Cl.
CPC .......... *H04W 76/14* (2018.02); *H04W 76/23* (2018.02); *H04W 92/18* (2013.01)

(56) References Cited

U.S. PATENT DOCUMENTS

| | | | |
|---|---|---|---|
| 2015/0163790 A1 | 6/2015 | Lee et al. | |
| 2016/0044665 A1* | 2/2016 | Novlan | H04W 76/14 370/336 |
| 2018/0199389 A1* | 7/2018 | Tu | H04W 74/04 |

OTHER PUBLICATIONS

LG Electronics, "R1-141349: Control design for D2D broadcast communication," 3rd Generation Partnership Project (3GPP), TSG RAN WG1 Meeting #76bis, Mar. 31-Apr. 4, 2014, 6 pages, Shenzhen, China.

CATR, "R1-141601: On control information of D2D communication," 3rd Generation Partnership Project (3GPP), TSG RAN WG1 Meeting #76bis, Mar. 31-Apr. 4, 2014, 2 pages, Shenzhen, China.

Author Unknown, "Technical Specification Group Services and System Aspects; Proximity-based services (ProSe); Stage 2 (Release 12)," Technical Specification 23.303, Version 12.0.0, 3GPP Organizational Partners, Feb. 2014, 53 pages.

Ericsson, "R1-141384: D2D Physical Channels Design," 3rd Generation Partnership Project (3GPP), TSG RAN WG1 Meeting #76bis, Mar. 31-Apr. 4, 2014, 10 pages, Shenzhen, China.

Lei, Lei, et al., "Operator Controlled Device-to-Device Communications in LTE-Advanced Networks," IEEE Wireless Communications, vol. 19, Issue 3, Jun. 2012, IEEE, pp. 96-104.

International Search Report and Written Opinion for International Patent Application No. PCT/SE2014/051564, dated Sep. 17, 2015, 13 pages.

Office Action for European Application No. 14888495.0, dated Sep. 5, 2018, 6 pages.

* cited by examiner

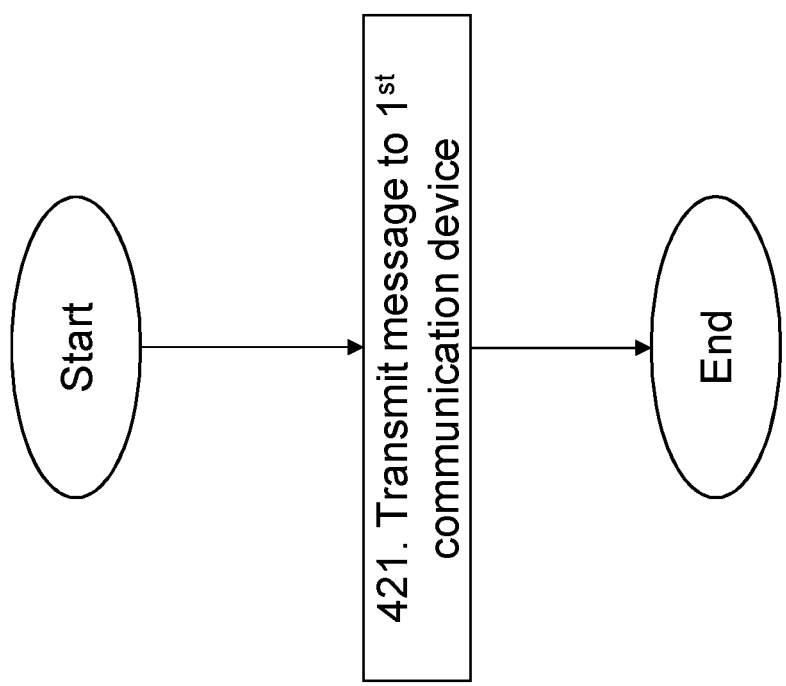

METHOD FOR ENABLING DEVICE TO DEVICE COMMUNICATION IN A RADIO COMMUNICATIONS NETWORK

This application is a 35 U.S.C. § 371 national phase filing of International Application No. PCT/SE2014/051564, filed Dec. 22, 2014, which claims the benefit of U.S. Provisional Application No. 61/974,514, filed Apr. 3, 2014, the disclosures of which are incorporated herein by reference in their entireties.

TECHNICAL FIELD

Embodiments herein relate to a first and second communication device, a control node and methods performed therein. In particular, embodiments herein relate to enabling device to device communication in a radio communications network.

BACKGROUND

In a typical radio communications network, communication devices, also known as wireless terminals, mobile stations and/or user equipments (UEs), communicate via a Radio Access Network (RAN) to one or more core networks (CN). The radio access network covers a geographical area which is divided into cell areas, with each cell area being served by a control node such as a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. The base stations communicate over the air interface operating on radio frequencies with the communication devices or user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for communication devices or user equipments. In a forum known as the Third Generation Partnership Project (3GPP), telecommunications suppliers propose and agree upon standards for third generation networks, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g. eNodeBs in LTE, and the core network. As such, the RAN of an EPS has an essentially "flat" architecture comprising radio base stations that do not report to RNCs.

Fundamental cellular communication occurs between one or more communication devices and a network, so that transmitted data always is routed via the base station. The base station includes functionality that ensures that the radio resource is used as efficiently as possible, by scheduling communication device transmissions based on some suitable metric.

There are reasons why communication directly from one communication device to another, i.e. without passing by a base station may be provided. Reasons could e.g. be that the base station is not working properly, or that direct communications are needed within a small area in an emergency situation or similar. Such direct communication between communication devices is often referred to as Device-to-Device (D2D) communication. In existing D2D concepts and technology components, a D2D layer may use cellular uplink (UL) and/or downlink (DL) resources that may overlap with radio resources used for supporting cellular traffic. The radio resources used by the D2D layer includes the physical resource blocks (PRB) that are used for control of the D2D traffic by the cellular base station (BS) such as an LTE eNB, the PRBs used by the D2D traffic, and the PRBs used for neighbor, or peer, discovery by a D2D capable communication device or user equipment.

In 3GPP D2D is called Proximity Services (ProSe); i.e. services that can be provided by the 3GPP system based on communication devices or UEs being in proximity to each other, i.e. receiving communication devices are within a distance from the transmitting communication device so that they can receive the transmissions. Architectures and reference models are described in TS 23.303 v. 12.0.0. The interface between communication devices in ProSe is called PC5 interface. The air or radio interface between an eNB and a communication device is called Uu interface.

D2D Data Transmission Procedure

The purpose of the data transmission procedure is to convey user data from one communication device, UE-A, to another communication device, UE-B. Investigations have shown that in order to meet the requirement on coverage, each D2D transport block needs to be transmitted four times. FIG. 1 shows an overall transmission procedure for D2D transmission with network (NW)-controlled resource allocation. The transmission procedure for D2D generally follows the procedure for legacy transmissions; the UE-A sends a scheduling request (SR) over Physical Uplink Control Channel (PUCCH) to the eNB, the eNB sends a grant to the UE-A over Physical Downlink Control Channel (PDCCH). For D2D the communication device, UE-A, further sends a buffer status report (BSR) for D2D (D2D BSR) with information on, among others, amount of data, over Physical Uplink Shared Channel (PUSCH); the eNB grants the communication device resources for transmission by transmitting a D2D grant.

The purpose of the D2D-BSR is to inform the eNB about the amount of data the UE has on logical channels related to D2D. Although this makes it possible to reuse the existing BSR, it would require at least one logical channel group for D2D communication. If the UE is also configured with legacy LTE bearers and D2D discovery, the four existing logical channel groups may become a restriction.

For D2D the eNB could set up periodic BSRs related to the validity time of the D2D grant for increased efficiency. It should be noted that the D2D-BSR is transmitted on the Uu interface and not on PC5 interface.

The D2D grant should be transmitted on the PDCCH similar to legacy PUSCH grants. The purpose of the grant is to allow the communication device to transmit data on the ProSe physical channel. The grant also allows the eNB to control which communication device gets to transmit when and on which radio resources. This reduces interference and the risk for collisions. A Scheduling assignment indicating radio resources for the D2D communication may further be informed back to the eNB over D2D physical channel (phy).

Before the communication device UE-A can transmit a Scheduling Assignment (SA) the UE-A needs to have a valid grant, FIG. 2. In FIG. 2 it is shown that the communication device, UE-A, performs a request and grant procedure with the eNB. This is followed by a scheduling assignment procedure between the communication devices and finally transmissions (TX) of data denoted Data 1-8 TX procedures, between the communication devices are performed. The Data 1-8 TX procedures allow for data to be sent just once, as well as to be repeated up to 7 times, thus allowing a total of 8 transmissions per cycle.

In the example in FIG. 3 assuming a configuration allowing a total of 4 transmissions per cycle, an SA cycle of a scheduling assignment procedure is 160 ms. In each SA cycle there are up to 4 occasions for a transmission of the SA. So, in short, every 40 ms there is an opportunity to send an SA, a next SA occasion. By having up to 4 opportunities a communication device may send an SA in one occasion and listen for other SAs in the same cycle. This means that a communication device can send and receive D2D transmissions continuously, if the transmission patterns are orthogonal i.e. transmission patterns of the D2D transmissions do not overlap in time, i.e. are sent in a Time Division Multiplex (TDM) fashion. The TX communication device sends an SA with control information, before sending actual data. In coverage the control information is based on information from a scheduling grant. Out of coverage the control information is pre-configured. The receiving communication device only needs to listen for the SA. From the control information in the SA the RX communication device knows on what resources to look for data. The purpose of the Scheduling assignment is twofold.

1) It allows the communication device to only track the SA and perform Discontinuous Reception (DRX) in-between.

2) It contains information on how to decode the data, e.g. which exact time frequency resource has been/will be used.

The different types of D2D traffic, e.g. control plane, user plane and discovery, impose an extra load on the radio resources that is not present in the radio communications networks that do not support D2D communication. E.g. prior to every transmission of data over a PC5 link, an SA needs to be transmitted with information on, e.g., radio resources to listen to in order to be able to decode data. Hence, the D2D communication increases the load in the radio communications network reducing the performance of the radio communications network.

SUMMARY

An object of embodiments disclosed herein is to enable D2D communication between communication devices in an efficient manner.

According to an aspect the object is achieved by a method performed in a first communication device for enabling device-to-device communication between the first communication device and a second communication device in a radio communications network. The first communication device transmits data in a first data transmission to the second communication device according to a first transmission pattern. The first communication device further transmits control information with the data to the second communication device, which control information indicates a second transmission pattern for a next data transmission from the first communication device to the second communication device.

According to another aspect the object is achieved by a method performed in a second communication device for enabling device-to-device communication between a first communication device and the second communication device in a radio communications network. The second communication device receives data in a first data transmission from the first communication device according to a first transmission pattern. Furthermore, the second communication device receives control information with the data from the first communication device, which control information indicates a second transmission pattern for a next data transmission from the first communication device to the second communication device.

According to yet another aspect the object is achieved by a method performed in a control node for enabling device-to-device communication between a first communication device and a second communication device in a radio communications network. The control node transmits a message to the first communication device, which message instructs the first communication device to multiplex control information for a next data transmission with data in a first data transmission.

According to yet another aspect the object is achieved by a first communication device for enabling device-to-device communication between the first communication device and a second communication device in a radio communications network. The first communication device is configured to transmit data in a first data transmission to the second communication device according to a first transmission pattern. The first communication device is further configured to transmit control information with the data to the second communication device, which control information indicates a second transmission pattern for a next data transmission from the first communication device to the second communication device.

According to still another aspect the object is achieved by a second communication device for enabling device-to-device communication between a first communication device and the second communication device in a radio communications network. The second communication device is configured to receive data in a first data transmission from the first communication device according to a first transmission pattern. The second communication device is also configured to receive control information with the data from the first communication device, which control information indicates a second transmission pattern for a next data transmission from the first communication device to the second communication device.

According to an additional aspect the object is achieved by a control node for enabling device-to-device communication between a first communication device and a second communication device in a radio communications network. The control node is configured to transmit a message to the first communication device, which message instructs the first communication device to multiplex control information for a next data transmission with data in a first data transmission.

Embodiments herein aim at an efficient process to enable D2D communication by reducing the overhead for D2D scheduling and/or increasing D2D scheduling reliability leading to an improved performance of the radio communications network as the load is reduced. For example, by multiplexing the control information, such as scheduling information, regarding future D2D transmissions with the first data transmission the signaling for enabling D2D communication is performed in a more efficient manner.

BRIEF DESCRIPTION OF DRAWINGS

Embodiments will now be described in more detail in relation to the enclosed drawings, in which:

FIG. 4d shows a flowchart depicting a method in a control node according to embodiments herein.

DETAILED DESCRIPTION

Figure 1:
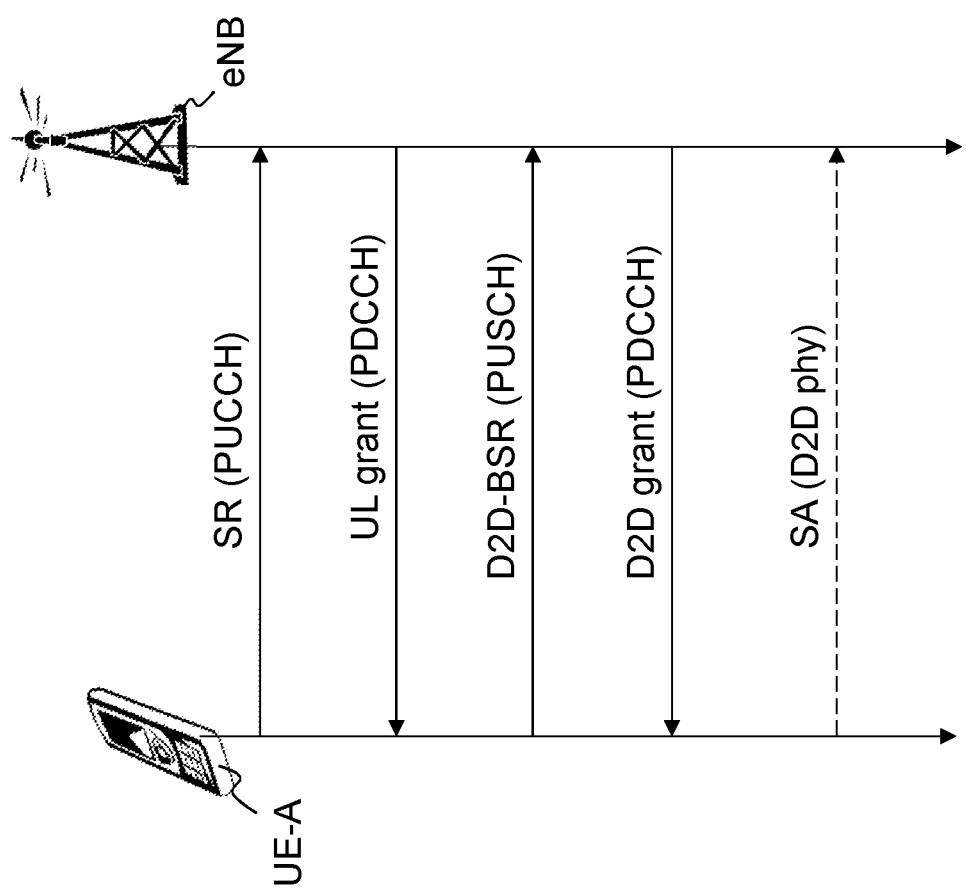
FIG. 1 shows a signalling scheme for D2D communication.
Figure 2:
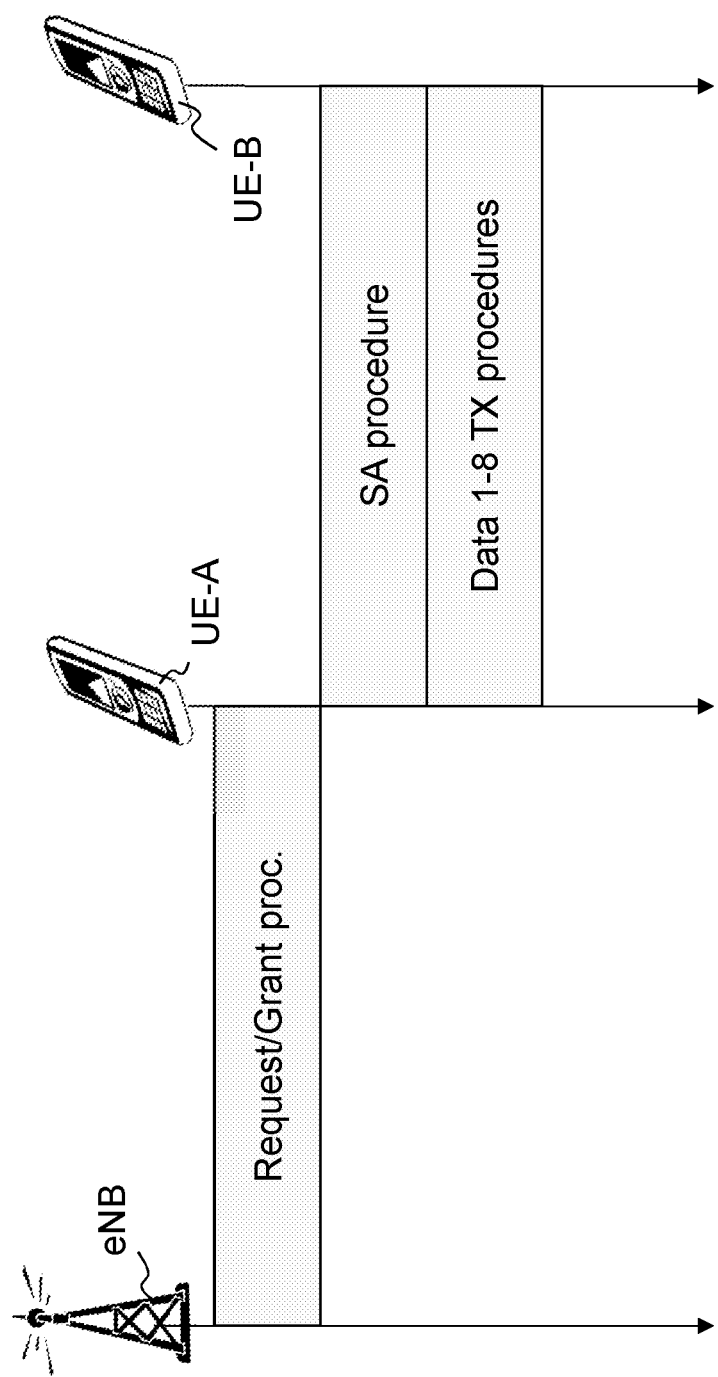
FIG. 2 shows a procedure scheme for D2D communication.
Figure 3:
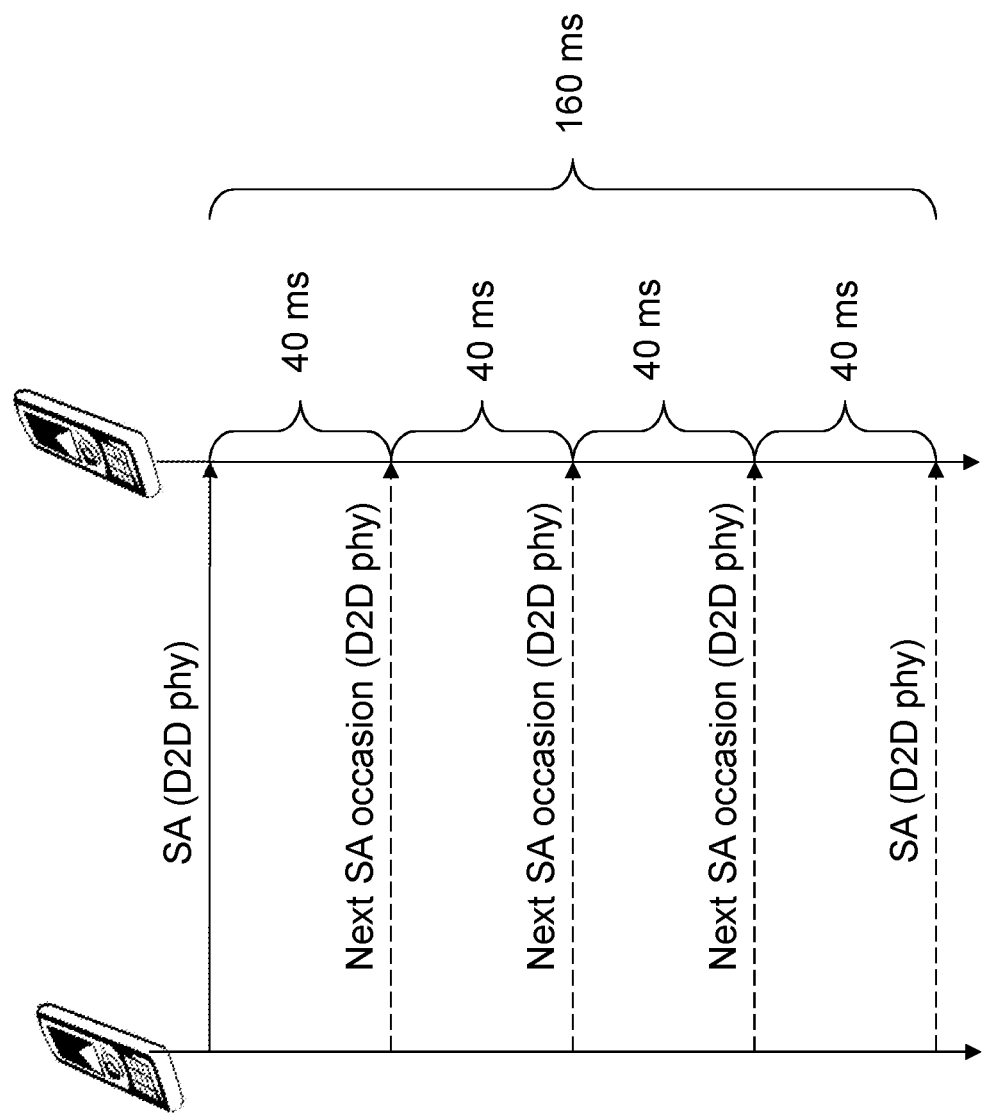
FIG. 3 shows a schematic overview of a scheduling assignment cycle.
Figure 4A:
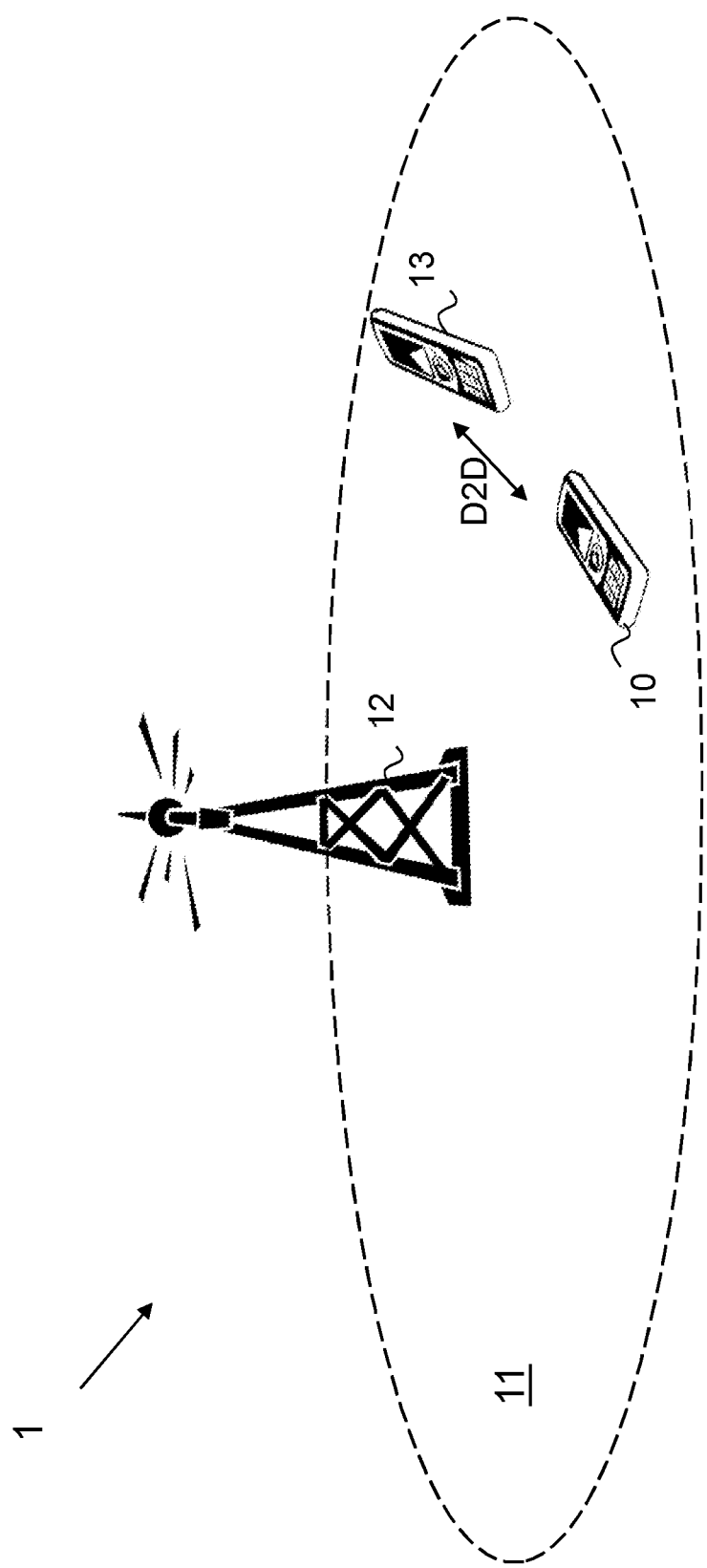
FIG. 4a shows a schematic overview depicting a radio communications network according to embodiments herein.

Embodiments herein relate to radio communications networks in general. FIG. 4a is a schematic overview depicting a radio communications network 1. The radio communications network 1 comprises one or more RANs and one or more CNs. The radio communications network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The radio communications network 1 is exemplified herein as an LTE network.

In the radio communications network 1, a first communication device 10, also known as a mobile station, a wireless device, a user equipment and/or a wireless terminal, communicates via a Radio Access Network (RAN) to one or more core networks (CN).

The radio communications network 1 covers a geographical area which is divided into cell areas, e.g. a cell 11 being served by a control node 12. The control node 12 may also be referred to as a radio base station and e.g. a NodeB, an evolved Node B (eNB, eNode B), a base transceiver station, Access Point Base Station, access point, base station router, a Radio Network Controller (RNC) or any other network unit capable of communicating with a communication device within the cell 11 served by the control node 12 depending e.g. on the radio access technology and terminology used. The control node 12 may serve one or more cells, such as the cell 11.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole radio communications network 1 is also broadcasted in the cell 11. The control node 12 may communicate over an air/radio interface operating on radio frequencies with the first communication device 10 within range of the control node 12. The first communication device 10 transmits data over the radio interface to the control node 12 in Uplink (UL) transmissions and the control node 12 transmits data over an air/radio interface to the first communication device 10 in Downlink (DL) transmissions.

Furthermore a second communication device 13 may be served in the cell 11 by the control node 12. It should be understood by the skilled in the art that "communication device" is a non-limiting term which means any wireless terminal, user equipment, Machine Type Communication (MTC) device, a Device to Device (D2D) terminal, a D2D enabled device, or node e.g. Personal Digital Assistant (PDA), laptop, mobile phone, sensor, relay, mobile tablet or even a small base station communicating within a respective cell.

The second communication device 13 may be communicating with the first communication device 10 directly over a D2D connection. Methods herein may be implemented in communication devices 10,13 that perform D2D communication, as a transmitter and/or receiver. Additionally, some embodiments may involve the control node that configures the first communication device 10, also referred to below as transmitter, and/or the second communication device 13, also referred to below as receiver, with certain parameters, e.g. radio resources to use, to perform embodiments disclosed herein.

Scheduling assignments (SA) are control messages used for direct scheduling of D2D communication. SAs are transmitted by e.g. the first communication device 10 that intends to transmit D2D data and the SAs are received by e.g. the second communication device 13 that is potentially interested in such data. SAs provide useful information that may be used by the receiver such as the second communication device 13, e.g., to correctly decode a D2D data transmission associated to the SA. The information provided by the SAs may for example be information on resources for data transmission, the modulation/coding parameters, timing information, identities for the transmitter and/or receiver, etc. Typically, but not necessarily, SAs are transmitted prior to an actual data transmission, so that a receiver such as the second communication device 13 is able to selectively receive data based on the content of the SAs. The data transmissions scheduled by a SA is referred to as a "transmission pattern" indicating allocated radio resources.

A number of options are possible for a physical transmission of SAs. E.g., one or multiple SAs may be transmitted by the first communication device 10 pointing to the same data transmission(s). SAs may also be transmitted with a certain redundancy or repeatedly, e.g. by use of retransmissions of the SA possibly with different coding parameters or redundancy versions. Each SA may possibly schedule a set of data transmissions comprising one or more Media Access Control (MAC) Protocol Data Units (PDU) encoded into one or more layer-1 transport blocks and codewords. Such coded bits may be transmitted over one or more layer-1 subframes and possible at multiple time instances. MAC PDU is a message exchanged between MAC entities in the respective communication device.

Due to the characteristics of D2D signals and hardware limitations in the communication devices, e.g., duplex constraints, partly unpredictable interference, in-band and out of band emissions, Auto Gain Control (AGC) inaccuracy, dynamic range limitations, receiver implementation impairments, etc., it is noted here that a receiver may occasionally fail to detect a SA of its interest or intended for it. The likely consequence is that the associated data transmissions are not received, with a significant impact on the performance and communication, especially for traffic types that do not support retransmissions, e.g., Voice over IP (VoIP) or broadcast transmissions. E.g., a typical Block Error Rate (BLER) requirement of VoIP such as 2% BLER would imply a significantly lower BLER on the SA, a requirement that is hardly fulfilled in a practical D2D system.

Embodiments herein are based on an observation that broadcast D2D traffic often requires multiple consecutive scheduling occasions i.e. SAs. E.g., VoIP traffic consists of transmission bursts that are relatively long compared to the typical periodicity of SAs and associated data transmissions, e.g. the transmission pattern.

Embodiments herein relate to a method to improve scheduling reliability whenever a transmission pattern, also referred to as data transmission pattern, data pattern or D2D data pattern, is to be followed by another transmission pattern from the same communication device.

Figure 4B:
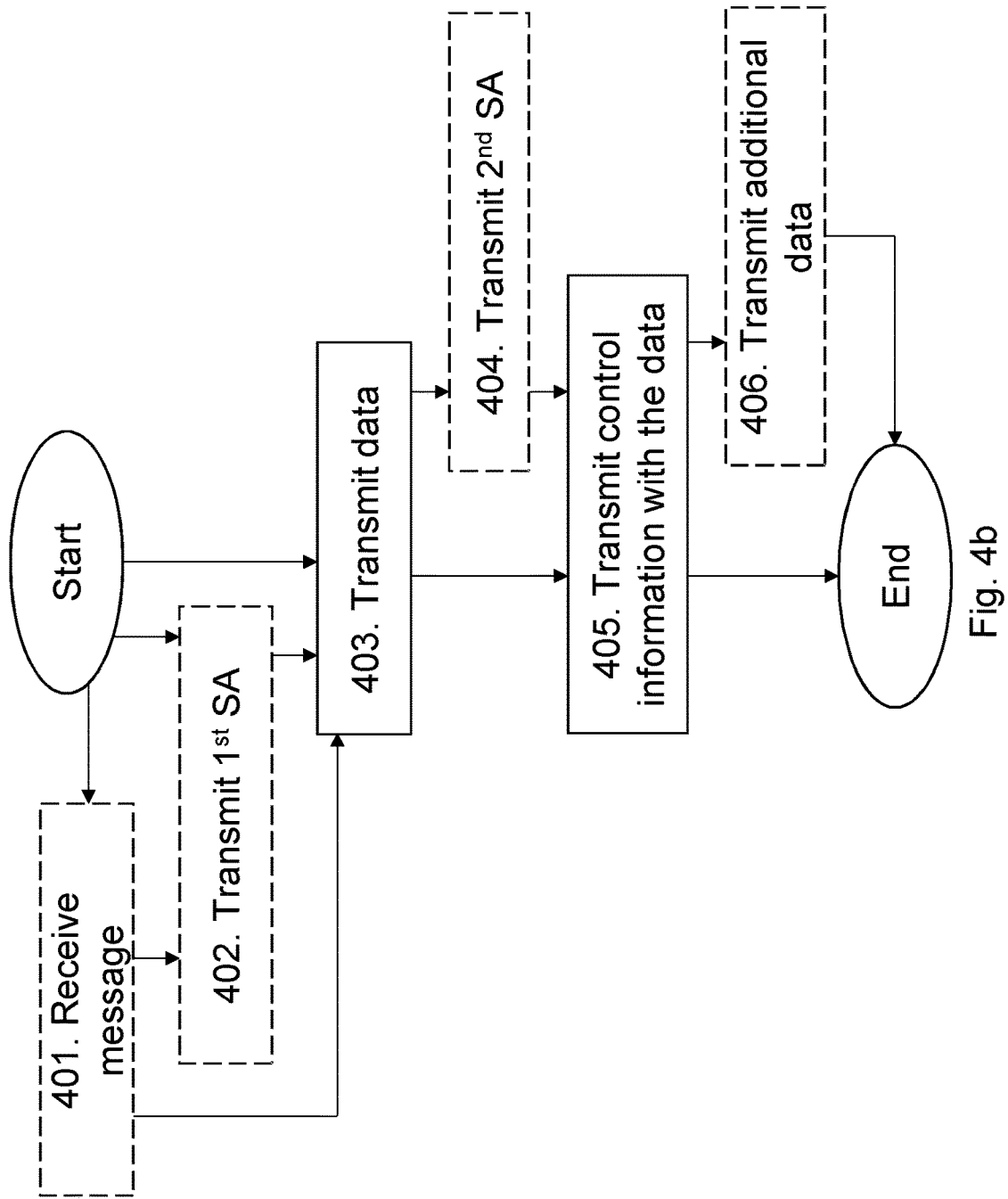
FIG. 4b shows a flowchart depicting a method in a first communication device according to embodiments herein.

The method actions performed in the first communication device 10 for enabling device-to-device communication between the first communication device 10 and the second communication device 13 in the radio communications network 1 according to some embodiments will now be described with reference to a flowchart depicted in FIG. 4*b*. The actions do not have to be taken in the order stated below, but may be taken in any suitable order. Actions performed in some embodiments are marked with dashed boxes.

Action 401. The first communication device 10 may receive a message from the control node 12, which message instructs the first communication device 10 to multiplex the control information for the next data transmission with data in a first data transmission.

Action 402. The first communication device 10 may transmit to the second communication device 13, a first scheduling assignment indicating the first transmission pattern.

Action 403. The first communication device 10 transmits data in the first data transmission to the second communication device 13 according to a first transmission pattern.

Action 404. The first communication device 10 may transmit, to the second communication device 13, a second scheduling assignment indicating the second transmission pattern.

Action 405. The first communication device 10 further transmits control information with the data to the second communication device 13. The control information indicates a second transmission pattern for a next data transmission from the first communication device 10 to the second communication device 13. The control information may be transmitted over a same physical channel, using same radio resources, as the data in the first data transmission, e.g. multiplexed with one another or sent as padding if there is no ordinary data.

In some embodiments transmitting the control information may comprise multiplexing the control information with the data of the first data transmission. For example, the control information may in one embodiment be multiplexed with a last packet, a last transport block and/or a last Medium Access Control Protocol Data Unit, MAC PDU, of the data.

Alternatively or additionally, the first communication device may implicitly transmit or indicate the control information by using a transmission parameter when transmitting the data to the second communication device 13, which transmission parameter maps to the control information. In other words, the control information is in this alternative obtained by mapping the transmission parameter to the control information e.g. according to one or more predefined rules. For example, the transmission parameter may comprise: a property of reference sequences used in the first transmission, e.g. a scrambling sequence, a cyclic shift, and/or an orthogonal cover code. The communication devices may then comprise tables mapping the transmission parameter to the control information. Thus, the first communication device 10 may implicitly or derivably transmit the control information.

The control information may in some embodiments indicate a reuse of at least a part of the first transmission pattern. For example, in an embodiment where the control information is implicitly transmitted using e.g. a cyclic shift as the transmission parameter, the cyclic shift may be mapped to the control information that the first transmission pattern should be reused as the second transmission pattern for the next data transmission.

The control information may be a scheduling assignment indicating the second transmission pattern, e.g. the second SA. The first and second transmission patterns may be indicating allocated radio resources. This may be performed before, simultaneously or after action 404.

Hence, according to embodiments herein a D2D transmitter such as the first communication device 10 may multiplex a first transmission pattern with a control information, which control information may be used to receive at least one second transmission pattern. The control information may be multiplexed in any way, e.g., control bits may be interleaved with data bits, Frequency Division Multiplexing (FDM), Time Division Multiplexing (TDM), Code Division Multiplexing (CDM), etc., and at any layer, e.g., physical layer, MAC layer, Radio Link Control (RLC) layer, etc. The control information may even be implicitly obtained from other transmission parameters. E.g., properties of reference sequences used at least in some of the transmissions of a first transmission pattern, such as a scrambling sequence, a cyclic shift, an orthogonal cover code, etc., may be mapped to control information for D2D scheduling of the at least one second transmission pattern according to one or more predefined rules. E.g., a certain cyclic shift value may be used as an indication that the second transmission pattern reuses at least some of the transmission parameters used in the first transmission pattern.

The control information transmission may be limited to one or more transmission instances, e.g., one or more subframes or radio resources, belonging to the first transmission pattern. E.g., if multiple transport blocks and/or MAC PDUs are carried by a single transmission pattern, only a last transport block and/or MAC PDU may be multiplexed with the control information.

In a further embodiment, the control information comprises an indication that the second transmission pattern reuses at least some of the transmission parameters, e.g., Modulation and Coding Scheme (MCS), bandwidth, resource allocation, identities, etc., associated to the first transmission pattern. Such control information may comprise a single bit or may be implicitly mapped to some layer-1 transmission parameter.

The transmitter or the first communication device 10 may or may not transmit both SAs and multiplexed control information scheduling the same at least one second transmission pattern.

Action 406. The first communication device 10 may then transmit additional data to the second communication device 13 according to the second transmission pattern in the next data transmission.

The communication between the first and second communication devices may be signals/message using a protocol over a PC5 link, a WLAN air interface or similar e.g. over a D2D physical channel. Control information such as first SA and second SA may be signaled over a control channel, and the control information along with the data of the first transmission may be transmitted over a shared or dedicated channel.

Figure 4C:
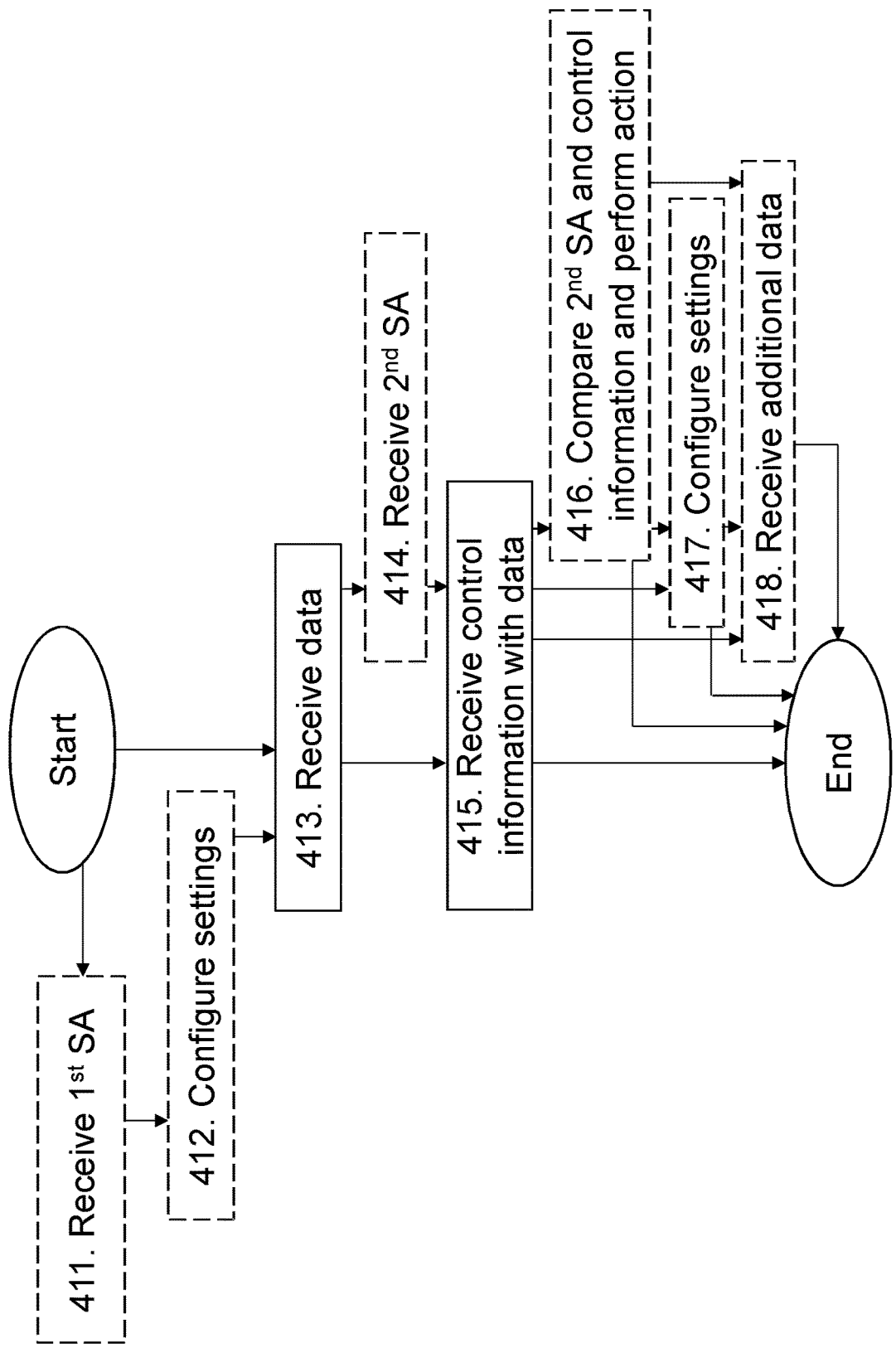
FIG. 4c shows a flowchart depicting a method in a second communication device according to embodiments herein.

The method actions performed in the second communication device 13 for enabling device-to-device communication between the first communication device 10 and the second communication device 13 in the radio communications network 1 according to some embodiments will now be described with reference to a flowchart depicted in FIG. 4c. The actions do not have to be taken in the order stated below, but may be taken in any suitable order. Actions performed in some embodiments are marked with dashed boxes.

Action 411. The second communication device 13 may receive a first scheduling assignment from the first communication device 10, which first scheduling assignment indicates the first transmission pattern.

Action 412. The second communication device 13 may then configure settings for listening for data transmissions in accordance with the received first scheduling assignment.

Action 413. The second communication device 13 receives data in the first data transmission from the first communication device 10 according to the first transmission pattern.

Action 414. The second communication device 13 may receive, from the first communication device 10, a second scheduling assignment indicating the second transmission pattern. The first and the second transmission patterns may indicate allocated radio resources.

Action 415. The second communication device 13 receives control information with the data from the first communication device 10, which control information indicates the second transmission pattern for a next data transmission from the first communication device 10 to the second communication device 13.

The control information may in some embodiments be multiplexed with the data. For example, the control information may in one embodiment be multiplexed with a last packet, a last transport block and/or a last Medium Access Control Protocol Data Unit, MAC PDU, of the data.

In some embodiments, the second communication device 13 may receive the control information by deriving the control information from the received data by determining a transmission parameter used when transmitting the data to the second communication device 13. In these embodiments, the transmission parameter maps to the control information, or in other words, the control information is obtained by mapping the transmission parameter to the control information e.g. according to one or more predefined rules. The transmission parameter may comprise a property of reference sequences used in the first transmission, such as a scrambling sequence, a cyclic shift, and/or an orthogonal cover code.

The control information may in some embodiments indicate a reuse of at least a part of the first transmission pattern. In other words, the control information may indicate that at least a part of the first transmission pattern is to be reused for the second transmission pattern.

Additionally or alternatively, the control information may be a scheduling assignment, e.g. a SA indicating the second transmission pattern. Thus, the receiver or the second communication device 13 may receive the first transmission and may detect the control information. Detection of the second transmission pattern may then be based on the detected control information.

Action 416. The second communication device 13 may then compare the received second scheduling assignment with the received control information. Then the second communication device 13 may perform least one of the following actions based on the comparison: —the second communication device 13 may configure settings to listen for data transmissions in accordance with the received second scheduling assignment and the received control information; —the second communication device 13 may ignore the second transmission pattern when the second transmission pattern indicated by the received control information is inconsistent with the second transmission pattern in the received second scheduling assignment; and the second communication device 13 may prioritize either the second scheduling assignment or the received control information according to a pre-determined rule. For example, a predetermined rule may state that if the second transmission pattern indicated by the received control information is inconsistent with the second transmission pattern in the received second scheduling assignment, the second transmission pattern indicated by the received scheduling assignment is used, thus prioritized. Hence, possibly, the second communication device 13 may detect also an SA, the second SA, scheduling the second transmission pattern. If disagreement between the contents of the second SA and the control information multiplexed with the first data pattern is detected by the second communication device 13, different receiver behaviors may be envisioned. In one example, the second communication device 13 attempts detection of the second transmission pattern according to all the received control information, both from SAs and/or the control information multiplexed with the first transmission pattern. In another example, the second communication device 13 may ignore the second transmission pattern if control information scheduling the second transmission pattern is inconsistent with information in the SA. In a further example the second communication device 13 prioritizes either the control information in the SA or the control information multiplexed with the first transmission pattern according to a pre-determined rule. The rule may be implementation-specific.

Action 417. The second communication device 13 may configure settings according to the received control information for receiving the next data transmission.

Action 418. The second communication device 13 may receive additional data from the first communication device 10 in the next data transmission according to the second transmission pattern.

With the proposed method the signaling to and from the control node 12 may be reduced. The scheduling information e.g. the SAs, may also be made redundant for increased reliability. Further, the radio resources made available, as transmissions of SAs is reduced, may be used for transmitting other information.

The method actions performed in the control node 12 for enabling device-to-device communication between the first communication device 10 and the second communication device 13 in the radio communications network 1 according to some embodiments will now be described with reference to a flowchart depicted in FIG. 4d. The actions do not have to be taken in the order stated below, but may be taken in any suitable order.

Action 421. The second communication device 13 may in some embodiments transmit a message to the first communication device 10. The message instructs the first communication device 10 to multiplex control information for a next data transmission with data in a first data transmission. The next data transmission is a subsequent data transmission from the first communication device 10 to the second communication device 13 relative to the first data transmission. The control information may indicate a second transmission pattern from the first communication device 10 to the second communication device 13.

Thus, in an embodiment, the control node 12, e.g., a radio base station, instructs the first communication device 10 to multiplex control information for the next data transmission with a first data pattern according to any of the embodiments herein.

Figure 5:
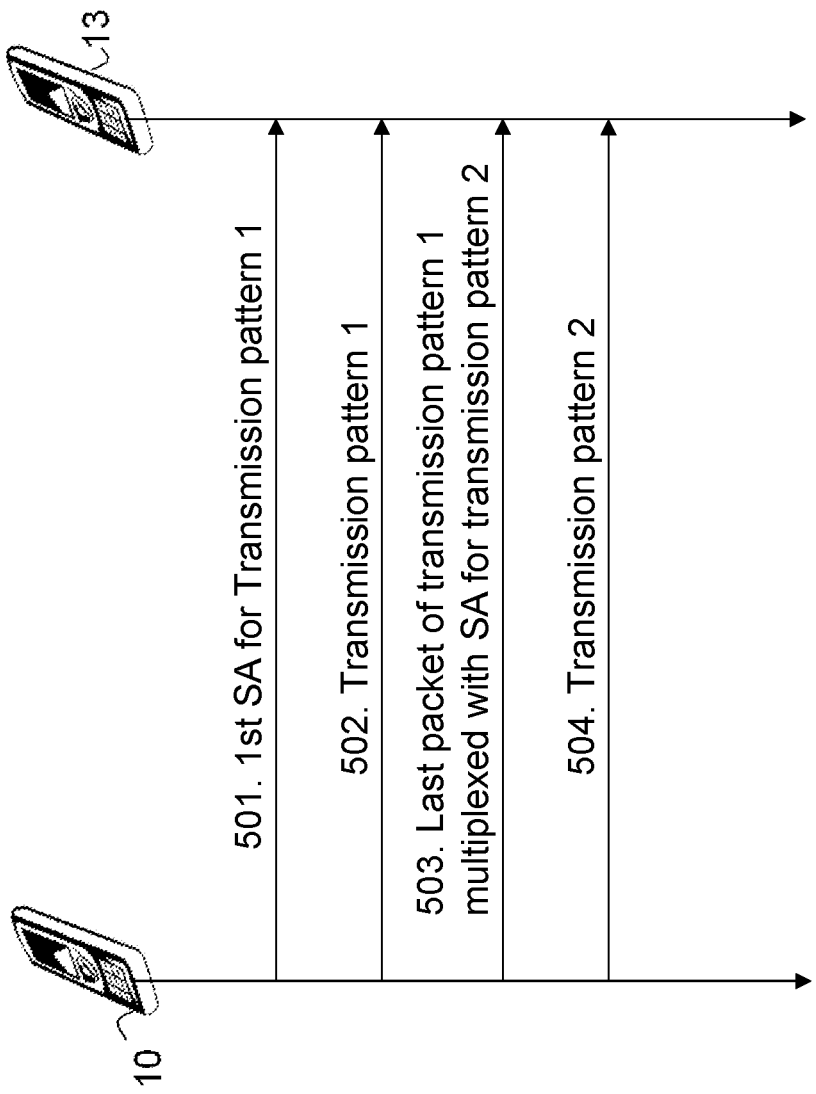
FIG. 5 shows a signalling scheme according to some embodiments herein.

FIG. 5 is a schematic signalling scheme depicting a method in the radio communications network 1 according to an example of embodiments herein.

Action 501. The first communication device 10 transmits to the second communication device 13, a first SA indicating a first transmission pattern e.g. of radio resources, such as frequencies (or frequency) and time, and parameters for a data transmission. E.g. the first SA from the first communication device 10 indicates a first transmission pattern for the second communication device 13 to receive data on. This action corresponds to action 402 in FIG. 4b.

Action 502. The first communication device 10 transmits to the second communication device 13, data according to the first transmission pattern, or transmits data over radio resources according to the first transmission pattern. This action corresponds to action 403 in FIG. 4b.

Action 503. The first communication device 10 transmits to the second communication device 13, a last packet or one of the last packets in accordance with the first pattern. Control information may be multiplexed into the last or one of the last packets, which control information, in e.g. the shape of a second SA, indicates a second transmission pattern for an upcoming or a next data transmission. Thereby the second SA does not need to be transmitted and if transmitted provides redundancy of the control information as the second SA and the transmitted control information may be used at the receiver to improve the reliability by comparing the second SA and the transmitted control information. In other words, the first communication device 10 may multiplex control information with the first transmission pattern, which control information may be used to receive data according to at least one second transmission pattern. This action corresponds to action 405 in FIG. 4b.

Action 504. The first communication device 10 transmits to the second communication device 13, additional data according to the second transmission pattern. This action corresponds to action 406 in FIG. 4b.

Figure 6:
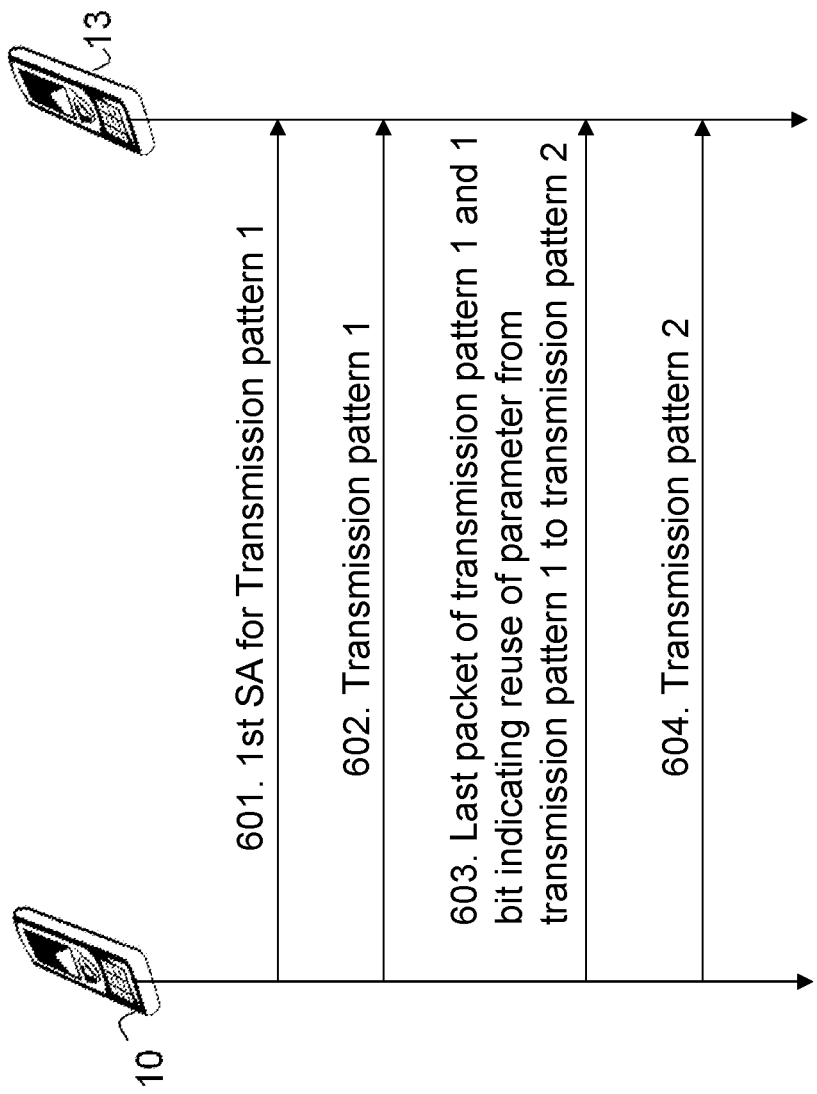
FIG. 6 shows a signalling scheme according to some embodiments herein.

FIG. 6 is a schematic signalling scheme depicting a method in the radio communications network 1 according to an example of embodiments herein.

Action 601. The first communication device 10 transmits to the second communication device 13, a first SA indicating a first transmission pattern e.g. of radio resources, such as frequencies (or frequency) and time, and parameters for a data transmission. E.g. the first SA from the first communication device 10 indicates a first transmission pattern for the second communication device 13 to receive data on. This action corresponds to action 402 in FIG. 4b Action 602. The first communication device 10 transmits to the second communication device 13, data according to the first transmission pattern, or transmits data over radio resources according to the first transmission pattern. This action corresponds to action 403 in FIG. 4b Action 603. The first communication device 10 transmits to the second communication device 13, a last packet or one of the last packets in accordance with the first pattern. Control information may be multiplexed into the last or one of the last packets, which control information, in e.g. 1 bit, indicates a second transmission pattern for an upcoming or a next data transmission. The 1 bit may indicate reuse of one or more parameters from the first transmission pattern. This action corresponds to action 405 in FIG. 4b. Thereby the second SA does not need to be transmitted and if transmitted provides redundancy of the information as stated in action 503 above.

Action 604. The first communication device 10 transmits additional data to the second communication device 13 according to the second transmission pattern. This action corresponds to action 406 in FIG. 4b.

Figure 7:
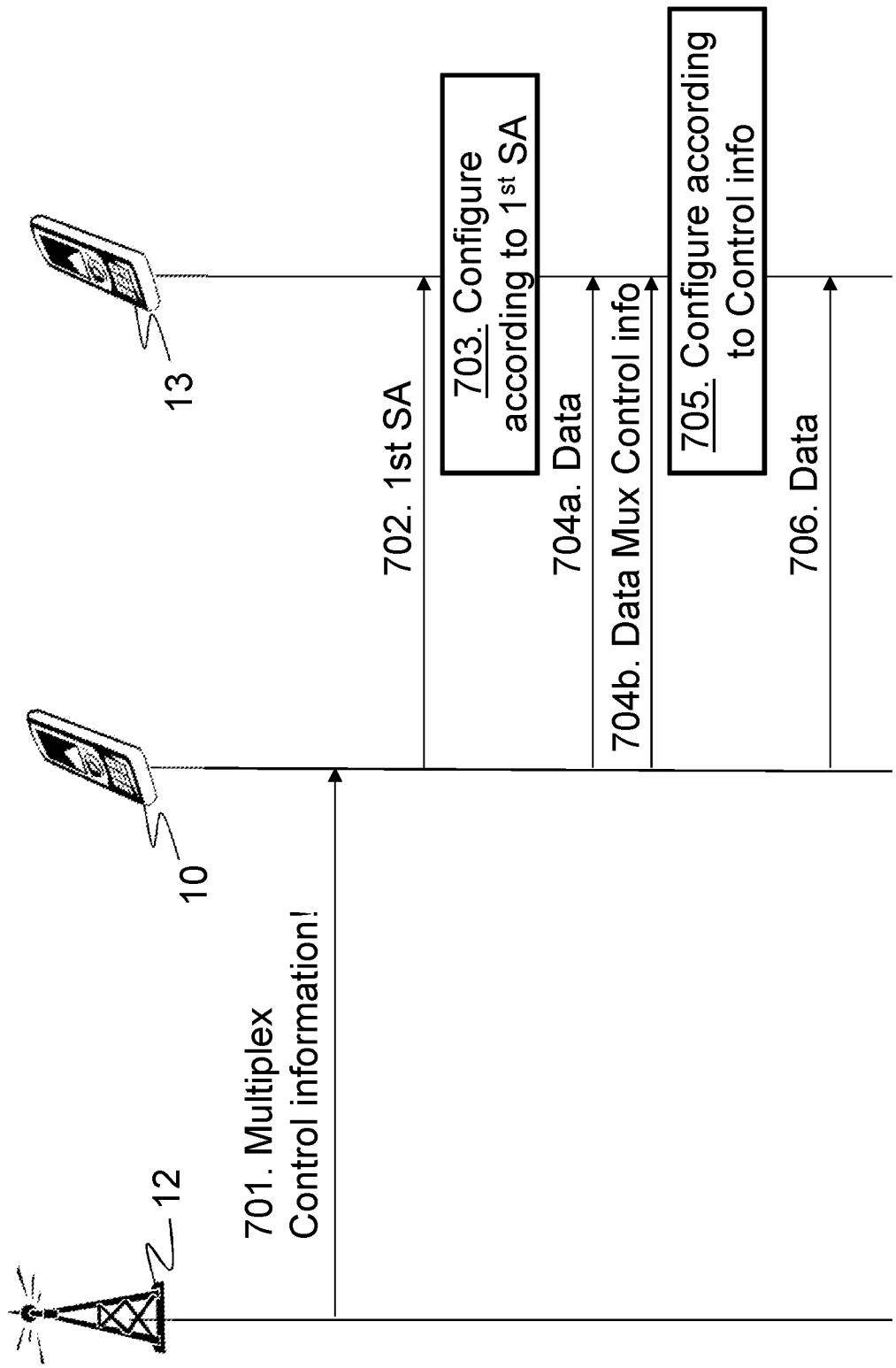
FIG. 7 shows a combined flowchart and signalling scheme according to some embodiments herein.

FIG. 7 is a schematic combined flow chart and signalling scheme for enabling or managing a D2D connection between the first communication device 10 and the second communication device 13.

Action 701. The control node 12, serving the first communication device 10 and the second communication device 13 may transmit an order or message indicating that the first communication device 10 is to multiplex control information in a present data transmission. The control information concerns an upcoming or next data transmission. The first communication device 10 has also received grants etc. indicating radio resources to be used in a D2D communication with the second communication device 13. This action corresponds to action 421 in FIG. 4d.

Action 702. The first communication device 10 may transmit a first SA to the second communication device 13 indicating a first transmission pattern. This action corresponds to action 402 in FIG. 4b.

Action 703. The second communication device 13 may be configured to listen for data transmissions in accordance with the received first SA. This action corresponds to action 412 in FIG. 4c.

Action 704. The first communication device 10 may then transmit data according to the first transmission pattern. This action corresponds to action 403 in FIG. 4b.

Action 705. The first communication device 10 then transmits data with control information multiplexed into the data transmission. The control information indicates a second transmission pattern. The first and second transmission patterns may be the same, partially the same, and/or different. This action corresponds to action 405 in FIG. 4b.

Action 706. The second communication device 13 may be reconfigured or reconfigure settings to listen and/or detect data transmissions sent in accordance with the second transmission pattern. This action corresponds to action 417 in FIG. 4c.

Action 707. The first communication device 10 transmits to the second communication device 13, additional data using radio resources according to the second transmission pattern. This action corresponds to action 406 in FIG. 4b.

Thus, the first communication device 10 may multiplex data in a first transmission pattern with control information that may be used to receive data according to a second transmission pattern. The control information may comprise an indication that the second transmission pattern reuses at least some of the transmission parameters from the first transmission pattern.

Figure 8:
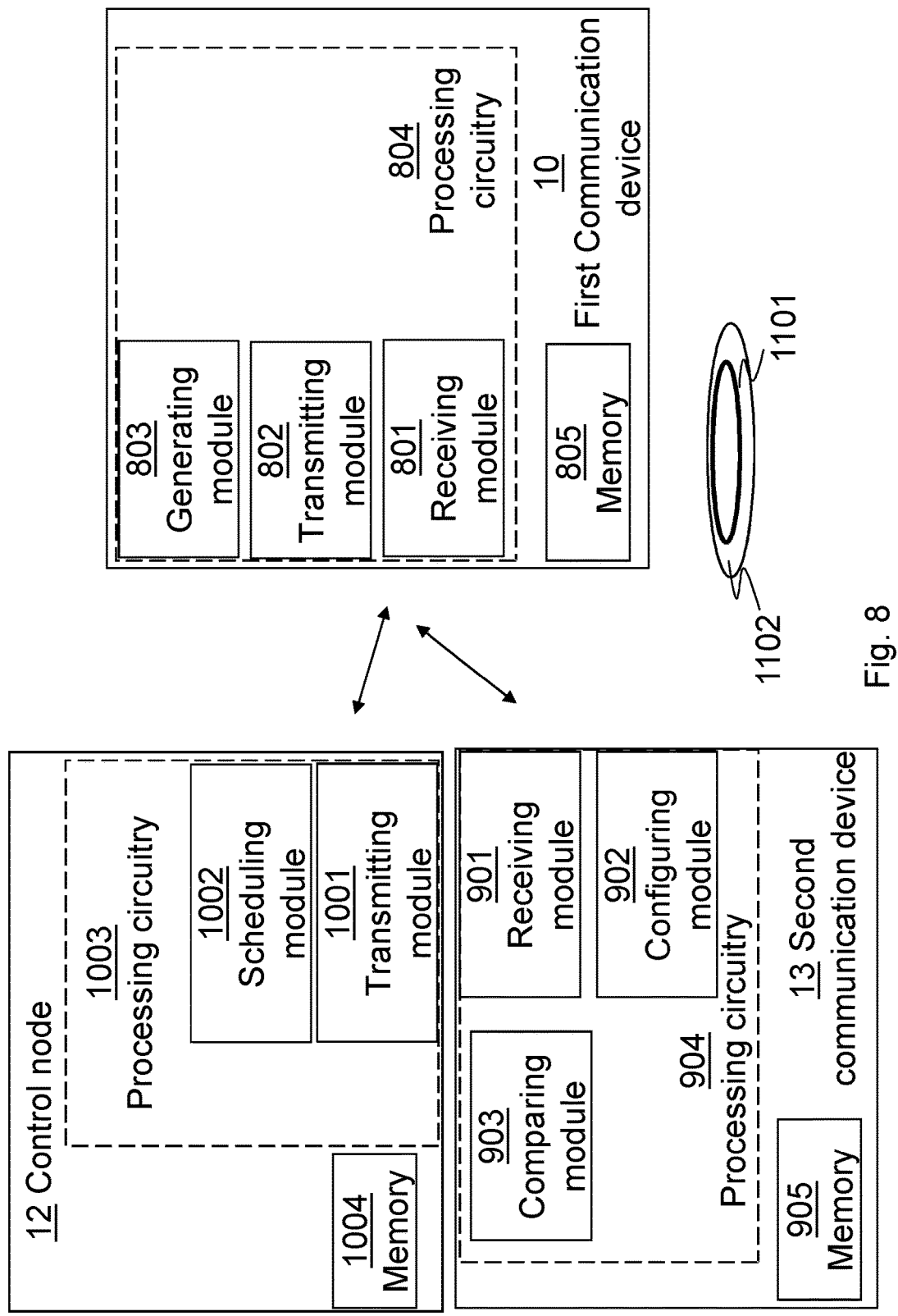
FIG. 8 shows block diagrams depicting a first and second communication device and a control node according to embodiments herein.

FIG. 8 is a block diagram depicting the radio base station 12, the first communication device 10 and the second communication device 13 to perform the methods herein.

FIG. 8 shows the first communication device 10 for enabling device-to-device communication between the first communication device 10 and the second communication device 13 in the radio communications network 1. The first communication device 10 is configured to transmit data in a first data transmission to the second communication device 13 according to a first transmission pattern. The first communication device 10 is further configured to transmit control information with the data to the second communication device 13, which control information indicates a second transmission pattern for a next data transmission from the first communication device 10 to the second communication device 13. The control information may in some embodiments indicate a reuse of at least a part of the first transmission pattern. In other words, the control information may indicate that at least a part of the first transmission pattern is to be reused for the second transmission pattern.

The first communication device 10 may further in some embodiments be configured to transmit the control information by multiplexing the control information with the data. The first communication device 10 may in one embodiment be configured to multiplex the control information with a last packet, a last transport block and/or a last Medium Access Control Protocol Data Unit, MAC PDU, of the data.

The first communication device 10 may additionally or alternatively further be configured to implicitly or derivably transmit or indicate the control information by using a transmission parameter when transmitting the data to the second communication device 13, which transmission parameter maps to the control information. The transmission parameter may comprise a property of reference sequences used in the first transmission, such as a scrambling sequence, a cyclic shift, and/or an orthogonal cover code.

The first communication device 10 may additionally be configured to receive a message from a control node 12, which message instructs the first communication device 10 to multiplex the control information for the next data transmission with data in the first data transmission.

The first communication device 10 may additionally be configured to transmit additional data to the second communication device 13 according to the second transmission pattern in the next data transmission. The first communication device 10 may also be configured to transmit, to the second communication device 13, a first scheduling assignment indicating the first transmission pattern. In some embodiments, the first communication device 10 may be configured to transmit, to the second communication device 13, a second scheduling assignment indicating the second transmission pattern. The control information may be a scheduling assignment indicating the second transmission pattern, and the first and second transmission patterns may be indicating allocated radio resources.

The first communication device 10 may comprise a receiving module 801, a transmitting module 802 and/or a generating module 803. Furthermore, the first communication device 10 may comprise processing means such as processing circuitry 804 e.g. one or more processors.

The first communication device 10, the receiving module 801 and/or the processing circuitry 804 may be configured to receive scheduling information from the control node 12 and/or an indication indicating that control information or scheduling information for an upcoming or next data transmission is to be multiplexed into a present data transmission over a D2D connection. For example, the receiving module 801 and/or the processing circuitry 804 may be configured to receive a message from the control node 12, which message instructs the first communication device 10 to multiplex the control information for the next data transmission with data in the first data transmission.

The first communication device 10, the transmitting module 802, and/or processing circuitry 804 may be configured to transmit data multiplexed with control information to the second communication device 13 over a D2D connection. The control information may be referred to as scheduling information, and indicates radio resources according to a second transmission pattern. The transmitting module 802, and/or processing circuitry 804 may be configured to transmit data in a first data transmission to the second communication device 13 according to a first transmission pattern; and to transmit control information with the data to the second communication device 13. The control information indicates a second transmission pattern for a next data transmission from the first communication device 10 to the second communication device 13. The transmitting module 802, and/or processing circuitry 804 may in some embodiments be configured to transmit the control information by multiplexing the control information with the data. E.g. the transmitting module 802, and/or processing circuitry 804 may be configured to multiplex the control information with a last packet, a last transport block and/or a last MAC PDU of the data. In embodiments herein the transmitting module 802, and/or processing circuitry 804 may be configured to implicitly transmit or indicate the control information by using a transmission parameter when transmitting the data to the second communication device 13, which transmission parameter maps to the control information. The transmission parameter may comprise a property of reference sequences used in the first transmission, such as a scrambling sequence, a cyclic shift, and/or an orthogonal cover code.

The transmitting module 802, and/or processing circuitry 804 may be configured to transmit additional data to the second communication device 13 according to the second transmission pattern in the next data transmission. The transmitting module 802, and/or processing circuitry 804 may be configured to transmit, to the second communication device 13, a first scheduling assignment indicating the first transmission pattern. The transmitting module 802, and/or processing circuitry 804 may in some embodiments be configured to transmit, to the second communication device 13, a second scheduling assignment indicating the second transmission pattern.

The control information may indicate a reuse of at least a part of the first transmission pattern for the second transmission pattern. The control information may be a scheduling assignment indicating the second transmission pattern. The first and second transmission patterns may be indicating allocated radio resources.

The first communication device 10, the generating module 803, and/or processing means 804 may be configured to generate a SA indicating the first transmission pattern. The first communication device 10, the generating module 803, and/or processing means 804 may further be configured to generate data multiplexed with the control information.

The first communication device 10 further comprises a memory 805. The memory comprises one or more units to be used to store data on, such as mappings between transmission parameters and control information, control information, transmission patterns, applications to perform the methods disclosed herein when being executed, and similar.

Furthermore, FIG. 8 shows the second communication device 13 for enabling device-to-device communication between the first communication device 10 and the second communication device 13 in the radio communications network 1. The second communication device 12 is configured to receive data in a first data transmission from the first communication device 10 according to a first transmission pattern. The second communication device 12 is further configured to receive control information with the data from the first communication device 10, which control information indicates a second transmission pattern for a next data transmission from the first communication device 10 to the second communication device 13. The second communication device 12 may further be configured to receive the control information multiplexed with the data. In one embodiment, the second communication device 12 may be configured to receive the control information multiplexed with the data such that the control information is multiplexed with a last packet, a last transport block and/or a last MAC PDU of the data. In some embodiments, the second communication device 12 may be configured to derive the control information from the received data by determining a transmission parameter used when transmitting the data to the second communication device 13. In these embodiments, the transmission parameter maps to the control information, or in other words, the control information is obtained by mapping the transmission parameter to the control information e.g. according to one or more predefined rules. For example, the mapping may be obtained from a table lookup or and indexed list or similar. The transmission parameter may comprise a property of reference sequences used in the first transmission, such as a scrambling sequence, a cyclic shift, and/or an orthogonal cover code. In some embodiments, the control information may indicate a reuse of at least a part of the first transmission pattern for the second transmission pattern. The second communication device 12 may be adapted or configured to configure settings according to the received control information for receiving the next data transmission.

In addition the second communication device 12 may be configured to receive a first scheduling assignment from the first communication device 10, which first scheduling assignment indicates the first transmission pattern. Then, the second communication device 12 may be configured to configure settings for listening for data transmissions in accordance with the received first scheduling assignment. The second communication device 12 may be configured to receive additional data from the first communication device 10 in the next data transmission according to the second transmission pattern. The second communication device 12 may in some embodiments further be configured to receive, from the first communication device 10, a second scheduling assignment indicating the second transmission pattern. Then, the second communication device 12 may further be configured to compare the received second scheduling assignment with the received control information. The second communication device 12 may then be configured to perform at least one of the following actions based on the comparison: the second communication device 12 may be configured to configure settings to listen for data transmissions in accordance with the received second scheduling assignment and the received control information; the second communication device 12 may be configured to ignore the second transmission pattern when the second transmission pattern indicated by the received control information is inconsistent with the second transmission pattern in the received second scheduling assignment; and the second communication device 12 may be configured to prioritize either the second scheduling assignment or the received control information according to a pre-determined rule. The control information may be a scheduling assignment indicating the second transmission pattern. The first and second transmission patterns may be indicating allocated radio resources.

The second communication device 13 may comprise a receiving module 901, a configuring module 902, and/or a comparing module 903. Furthermore, the first communication device 10 may comprise processing means such as processing circuitry 904 e.g. one or more processors.

The second communication device 13, the receiving module 901 and/or the processing circuitry 904 may be configured to receive an SA, data transmitted over the first transmission pattern and/or control information transmitted with the data transmitted in accordance with the first transmission pattern. The control information indicates the second transmission pattern. For example, the receiving module 901 and/or the processing circuitry 904 may be configured to receive data in a first data transmission from the first communication device 10 according to a first transmission pattern. The receiving module 901 and/or the processing circuitry 904 may further be configured to receive control information with the data from the first communication device 10, which control information indicates a second transmission pattern for a next data transmission from the first communication device 10 to the second communication device 13. The receiving module 901 and/or the processing circuitry 904 may in one embodiment further be configured to receive the control information multiplexed with the data. The receiving module 901 and/or the processing circuitry 904 may further be configured to receive the control information multiplexed with the data such that the control information is multiplexed with a last packet, a last transport block and/or a last MAC PDU of the data. In some embodiments the receiving module 901 and/or the processing circuitry 904 may further be configured to derive the control information from the received data by determining a transmission parameter used when transmitting the data to the second communication device 13, which transmission parameter maps to the control information. The transmission parameter may comprise a property of reference sequences used in the first transmission, such as a scrambling sequence, a cyclic shift, and/or an orthogonal cover code. The control information may indicate a reuse of at least a part of the first transmission pattern for the second transmission pattern.

The second communication device 13, the configuring module 902 and/or the processing circuitry 904 may be configured to listen/detect data transmissions according to the first transmission pattern and/or the second transmission pattern. E.g. the configuring module 902 and/or the processing circuitry 904 may be adapted or configured to configure settings according to the received control information for receiving the next data transmission.

The receiving module 901 and/or the processing circuitry 904 may further be configured to receive a first scheduling assignment from the first communication device 10, which first scheduling assignment indicates the first transmission pattern. The configuring module 902 and/or the processing circuitry 904 may then be configured to configure settings for listening for data transmissions in accordance with the received first scheduling assignment.

The receiving module 901 and/or the processing circuitry 904 may further be configured to receive additional data from the first communication device 10 in the next data transmission according to the second transmission pattern.

The receiving module 901 and/or the processing circuitry 904 may further be configured to receive, from the first communication device 10, a second scheduling assignment indicating the second transmission pattern.

The comparing module 903 and/or the processing circuitry 904 may further be configured to compare the received second scheduling assignment with the received control information; and the second communication device 13, the configuring module 902 and/or the processing circuitry 904 may be configured to perform at least one of the following actions based on the comparison:
- the second communication device 13, the configuring module 902 and/or the processing circuitry 904 may be configured to configure settings to listen for data transmissions in accordance with the received second scheduling assignment and the received control information;
- the second communication device 13, the configuring module 902 and/or the processing circuitry 904 may be configured to to ignore the second transmission pattern when the second transmission pattern indicated by the received control information is inconsistent with the second transmission pattern in the received second scheduling assignment; and
- the second communication device 13, the configuring module 902 and/or the processing circuitry 904 may be configured to to prioritize either the second scheduling assignment or the received control information according to a pre-determined rule.

The control information may be a scheduling assignment indicating the second transmission pattern. The first and second transmission patterns may be indicating allocated radio resources.

The second communication device 13 further comprises a memory 905. The memory comprises one or more units to be used to store data on, such as mappings between transmission parameters and control information, control information, transmission patterns, applications to perform the methods disclosed herein when being executed, and similar.

FIG. 8 further shows the control node 12, according to some embodiments, for enabling device-to-device communication between the first communication device 10 and the second communication device 13 in the radio communications network 1. The control node 12 is configured to transmit a message to the first communication device 10. The message instructs the first communication device 10 to multiplex control information for a next data transmission with data in a first data transmission, transmitted e.g. according to a first transmission pattern. The next data transmission is subsequent to the first data transmission. The control information may indicate a second transmission pattern for a next data transmission from the first communication device 10 to the second communication device 13.

The control node 12 may comprise a transmitting module 1001, a scheduling module 1002 and/or processing means such as processing circuitry 1003, e.g. one or more processors.

The control node 12, the transmitting module 1001 and/or the processing circuitry 1003 may be configured to transmit scheduling information for D2D communication, an indication indicating that control information is to be multiplexed with a data transmission between communication devices in a D2D connection, and similar. The transmitting module 1001 and/or the processing circuitry 1003 may be configured to transmit the message to the first communication device 10, which message instructs the first communication device 10 to multiplex control information for a next transmission with data in a first data transmission. The control information may indicate a second transmission pattern for the next data transmission from the first communication device 10 to the second communication device 13. The next data transmission is subsequent to the first data transmission.

The control node 12, the scheduling module 1002 and/or the processing circuitry 1003 may be configured to schedule radio resources for D2D communication or similar.

The radio base station 12 may comprise a memory 1004. The memory comprises one or more units to be used to store data on, such as mappings between transmission parameters and control information, control information, transmission patterns, instructions, applications to perform the methods disclosed herein when being executed, and similar.

The embodiments herein for enabling D2D communication may be implemented through processing means e.g. one or more processors, together with computer program code for performing the functions and/or method actions of the embodiments herein. The program code mentioned may also be provided as a computer program product, for instance in the form of a data carrier carrying computer program code for performing embodiments herein when being loaded into the communication devices or control node. One such carrier may be in the form of a CD ROM disc. It is however feasible with other data carriers such as a memory stick. The computer program code may furthermore be provided as pure program code on a server and downloaded to the communication devices or control node.

The methods according to the embodiments described herein may be respectively implemented by means of e.g. a computer program 1101 or a computer program product, comprising instructions, i.e., software code portions, which, when executed on at least one processor, cause the at least one processor to carry out the actions described herein, as performed by the communication devices or the control node. The computer program 1101 may be stored on a computer-readable storage medium 1102, e.g. a disc or similar. The computer-readable storage medium 1102, having stored thereon the computer program 1101, may comprise the instructions which, when executed on at least one processor, cause the at least one processor to carry out the actions described herein, as performed by the communication devices or control node. In some embodiments, the computer-readable storage medium 1102 may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a communication device and/or control node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed in a first communication device for enabling device-to-device communication between the first communication device and a second communication device in a radio communications network the method comprising:
transmitting data in a first data transmission to the second communication device according to a first transmission pattern; and
transmitting control information with the data to the second communication device, which control information indicates a second transmission pattern for a next data transmission from the first communication device to the second communication device.

2. The method according to claim 1, wherein the transmitting control information comprises multiplexing the control information with the data.

3. The method according to claim 1, wherein the control information is multiplexed with a last packet, a last transport block and/or a last Medium Access Control Protocol Data Unit, MAC PDU, of the data.

4. The method according to claim 1, wherein the transmitting the control information comprises implicitly transmitting the control information by using a transmission parameter when transmitting the data to the second communication device, which transmission parameter maps to the control information.

5. The method according to claim 4, wherein the transmission parameter comprises a property of reference sequences used in the first transmission.

6. The method according to claim 1, wherein the control information indicates a reuse of at least a part of the first transmission pattern.

7. The method according to claim 1, further comprising receiving a message from a control node, which message instructs the first communication device to multiplex the control information for the next data transmission with data in the first data transmission.

8. The method according to claim 1, further comprising transmitting additional data to the second communication device according to the second transmission pattern in the next data transmission.

9. The method according to claim 1, further comprising transmitting to the second communication device, a first scheduling assignment indicating the first transmission pattern.

10. The method according to claim 1, further comprising transmitting to the second communication device, a second scheduling assignment indicating the second transmission pattern.

11. The method according to claim 1, wherein the control information is a scheduling assignment indicating the second transmission pattern.

12. The method according to claim 1, wherein the first and second transmission patterns indicate allocated radio resources.

13. A method performed in a second communication device for enabling device-to-device communication between a first communication device and the second communication device in a radio communications network; the method comprising:
receiving data in a first data transmission from the first communication device according to a first transmission pattern; and
receiving control information with the data from the first communication device, which control information indicates a second transmission pattern for a next data transmission from the first communication device to the second communication device.

14. The method according to claim 13, wherein the control information is multiplexed with the data.

15. The method according to claim 13, wherein the control information is multiplexed with a last packet, a last transport block and/or a last Medium Access Control Protocol Data Unit, MAC PDU, of the data.

16. The method according to claim 13, wherein the receiving the control information comprises deriving the control information from the received data by determining a transmission parameter used when transmitting the data to the second communication device, which transmission parameter maps to the control information.

17. The method according claim 16, wherein the transmission parameter comprises a property of reference sequences used in the first transmission.

18. The method according to claim 13, wherein the control information indicates a reuse of at least a part of the first transmission pattern.

19. The method according to claim 13, further comprising configuring settings according to the received control information for receiving the next data transmission.

20. The method according to claim 13, further comprising receiving a first scheduling assignment from the first communication device, which first scheduling assignment indicates the first transmission pattern; and
configuring settings for listening for data transmissions in accordance with the received first scheduling assignment.

21. The method according to claim 13, further comprising receiving additional data from the first communication device in the next data transmission according to the second transmission pattern.

22. The method according to claim 13, further comprising receiving, from the first communication device, a second scheduling assignment indicating the second transmission pattern.

23. The method according to claim 22, further comprising comparing the received second scheduling assignment with the received control information; and performing at least one of the following actions based on the comparison: configuring settings to listen for data transmissions in accordance with the received second scheduling assignment and the received control information; ignoring the second transmission pattern when the second transmission pattern indicated by the received control information is inconsistent with the second transmission pattern in the received second scheduling assignment; and prioritizing either the second scheduling assignment or the received control information according to a pre-determined rule.

24. The method according to claim 13, wherein the control information is a scheduling assignment indicating the second transmission pattern.

25. The method according to claim 13, wherein the first and second transmission patterns indicate allocated radio resources.

26. A method performed in a control node for enabling device-to-device communication between a first communication device and a second communication device in a radio communications network; the method comprising transmitting a message to the first communication device, which message instructs the first communication device to multiplex control information for a next data transmission with data in a first data transmission, wherein the control information indicates a second transmission pattern for the next data transmission from the first communication device to the second communication device.

27. A first communication device for enabling device-to-device communication between the first communication device and a second communication device in a radio communications network wherein the first communication device comprises:

a memory; and
a processing circuitry configured to:
transmit data in a first data transmission to the second communication device according to a first transmission pattern; and to
transmit control information with the data to the second communication device, which control information indicates a second transmission pattern for a next data transmission from the first communication device to the second communication device.

28. A second communication device for enabling device-to-device communication between a first communication device and the second communication device in a radio communications network wherein the second communication device comprises:

a memory; and
a processing circuitry configured to:
receive data in a first data transmission from the first communication device according to a first transmission pattern; and to
receive control information with the data from the first communication device, which control information indicates a second transmission pattern for a next data transmission from the first communication device to the second communication device.

29. A control node for enabling device-to-device communication between a first communication device and a second communication device in a radio communications network wherein the control node comprises:

a memory; and
a processing circuitry configured to:
transmit a message to the first communication device, which message instructs the first communication device to multiplex control information for a next data transmission with data in a first data transmission,
wherein the control information indicates a second transmission pattern for the next data transmission from the first communication device to the second communication device.

* * * * *